3,149,121
CERTAIN TRIS(2-OXAZOLIDINONE)-PHOSPHINYLIDYNES

James J. Davies and Wilhelm E. Walles, Midland, Mich., assignors to The Dow Chemical Company, Midland, Mich., a corporation of Delaware
No Drawing. Filed Oct. 14, 1963, Ser. No. 316,143
3 Claims. (Cl. 260—307)

The present invention is concerned with organic chemistry and is more particularly directed to 3,3′,3″-phosphinylidyne tris-2(oxazolidinone) compounds. The present compounds are of the formula

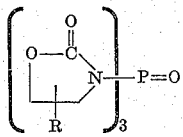

wherein R represents hydrogen, methyl or ethyl. The compounds are colorless crystalline solids, melting above the atmospheric boiling temperature of water, soluble to the extent of approximately 1 percent by weight in absolute ethanol at 20° C., and soluble between 1 and 10 percent by weight in absolute ethanol at 50° C. The compounds are relatively soluble in chloroform. The infrared spectrum confirms the assigned structures. The compounds are useful as insecticides and, when applied to house flies as sole toxicant in aqueous dispersion in a concentration of one part of toxicant per 500 parts dispersion, such compound kills flies. Also, they are useful as flame-retardant additives in otherwise readily flammable materials such as fabrics, wood, and paper; and as reactants for textile fibers to impart crease resistance to them.

The compounds are prepared by causing a reaction between phosphoryl chloride and an N-alkali metal oxazolidinone of the formula:

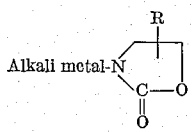

wherein R is as hereinbefore defined. Conveniently, the reaction is carried out in the absence of oxygen, as under an inert gas blanket or the like, and goes forward at a satisfactory rate at room temperature, with formation of the desired compound and alkali metal chloride of reaction. 3 moles of N-alkali metal-2-oxazolidinone are required for complete reaction, in the preparation of the present product, for each mole of phosphoryl chloride. The reaction is conveniently carried out in inert liquid reaction medium. The combination of the reactants may be carried out in any convenient manner, but, in view of the evolution of prompt and abundant heat of reaction it is preferably carried out gradually, portionwise, and with stirring.

Upon the completion of the reaction, the desired product is readily separated from phosphoryl chloride and from halide of reaction by water extraction, any unconsumed phosphoryl chloride and alkali metal chloride being water-soluble, whereas the product of the present invention is soluble in water to only a slight extent. Moreover, if desired, a water-immiscible solvent such as diethylether may be used to extract an aqueous wash layer whereby to remove therefrom a proportion of the product of the present invention otherwise lost in the water wash. When it is desired to take up the product of the present invention in an organic layer immiscible with the said water layer, such solvent as chloroform can be used. The desired product can be purified in known ways, as by recrystallization from a loweralkanol wherein, at elevated temperatures, it is relatively soluble, crystallizing out upon cooling of the solvent.

The following example illustrates the best manner of practicing the present invention now known to the inventors.

N-sodio-5-methyl-2-oxazolidinone (30 grams; approximately 0.3 mole) was dissolved in 150 milliliters dimethylformamide under nitrogen blanket and with stirring. Before the introduction of the said reactant, the dimethylformamide had been purged with nitrogen gas. Thereafter, 12.46 grams (approximately 1/12 mole) phosphoryl chloride was added thereto, slowly, drop-wise, and with continuous stirring. Upon the completion of the addition of the phosphoryl chloride, the solution was allowed to remain at room temperature, and with continued stirring for one hour to carry the reaction to completion.

Upon completion of the reaction, the resulting mixture was filtered to remove insoluble matter consisting essentially of sodium chloride of reaction and unreacted sodio oxazolidinone starting material. The filtrate was poured into a separatory funnel containing 300 milliliters of liquid, of which approximately half was water and half chloroform in unmixed layers. The resulting mixture was thoroughly shaken, to separate the water-soluble and chloroform-soluble materials, and thereafter allowed to stand until the separate phases segegrated. Thereafter, the aqueous layer was removed and discarded and the chloroform layer containing the desired product was separated and transferred to an evaporation vessel. Solvent was evaporated therefrom, with gentle heating, and the resulting solids dissolved in hot absolute ethanol which was thereafter permitted to cool with the result that white crystals formed. The white crystals were thereafter heated in a vacuum oven to remove traces of solvent. As a result of these procedures there was obtained 9.5 grams (33 percent of theoretical yield) of 3,3′,3″-phosphinylidyne tris(5-methyl-2-oxazolidinone).

A sample of the product was analyzed for contents of carbon, hydrogen, nitrogen, and phosphorus; the results obtained were 41.47, 5.26, 12.36, and 9.23 percent as compared with theoretical values of 41.5, 5.22, 12.09, and 8.92 percent respectively.

The infrared spectrum confirmed the assigned structure, with distinctive absorption bands at 5.67, 5.76, 7.21, 7.78, 8.4, 8.7, 8.93, 12.91, and 13.28 microns.

Similarly, by reacting 3 molecular equivalents of 3-sodio-2-oxazolidinone and 1 molecular equivalent of phosphoryl chloride there is obtained 3,3′,3″-phosphinylidyne tris(2-oxazolidinone).

Also, by reaction 3-sodio-5-ethyl-2-oxazolidinone and phosphoryl chloride there is obtained 3,3′,3″-phosphinylidyne tris(5-ethyl-2-oxazolidinone).

We claim:
1. Compound of the formula:

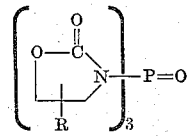

wherein R is a member of the group consisting of hydrogen, methyl and ethyl.
2. 3,3′,3″-phosphinylidyne tris(5 - methyl-2 - oxazolidinone).
2. 3,3′,3″- phosphinylidine tris(5 - ethyl-2-oxazolidinone).

No references cited.